US012076660B2

(12) United States Patent
Andersson et al.

(10) Patent No.: US 12,076,660 B2
(45) Date of Patent: Sep. 3, 2024

(54) PLATE HEAT EXCHANGER, A HEAT EXCHANGING PLATE AND A METHOD OF TREATING A FEED SUCH AS SEA WATER

(71) Applicant: ALFA LAVAL CORPORATE AB, Lund (SE)

(72) Inventors: Matz Andersson, Lund (SE); Hjalmar Joensen, Esbjerg (DK); Ralf Blomgren, Falsterbo (SE); Björn Wilhelmsson, Löddeköpinge (SE); Jonas Sloth, Copenhagen S (DK)

(73) Assignee: ALFA LAVAL CORPORATE AB, Lund (SE)

( * ) Notice: Subject to any disclaimer, the term of this patent is extended or adjusted under 35 U.S.C. 154(b) by 901 days.

(21) Appl. No.: 17/057,400

(22) PCT Filed: Jun. 4, 2019

(86) PCT No.: PCT/EP2019/064474
§ 371 (c)(1),
(2) Date: Nov. 20, 2020

(87) PCT Pub. No.: WO2019/234015
PCT Pub. Date: Dec. 12, 2019

(65) Prior Publication Data
US 2021/0197098 A1    Jul. 1, 2021

(30) Foreign Application Priority Data
Jun. 7, 2018  (EP) .................................... 18176540

(51) Int. Cl.
*A61L 9/00* (2006.01)
*B01D 1/22* (2006.01)
(Continued)

(52) U.S. Cl.
CPC .............. *B01D 1/221* (2013.01); *B01D 1/30* (2013.01); *B01D 5/006* (2013.01); *C02F 1/08* (2013.01);
(Continued)

(58) Field of Classification Search
CPC ............................... A61L 2/18; A61L 2202/11
(Continued)

(56) References Cited

U.S. PATENT DOCUMENTS 5,133,837 A    7/1992   Elmore et al.
6,635,150 B1  10/2003  Le et al.
(Continued)

FOREIGN PATENT DOCUMENTS

CN    101151500 A    3/2008
CN    201095602 Y    8/2008
(Continued)

OTHER PUBLICATIONS

English Translation of the First Office Action issued Sep. 24, 2021, by the National Intellectual Property Administration, P.R. China in corresponding Chinese Patent Application No. 201980037434.X. (9 pages).
(Continued)

*Primary Examiner* — Monzer R Chorbaji
(74) *Attorney, Agent, or Firm* — BUCHANAN INGERSOLL & ROONEY PC

(57) ABSTRACT

The present invention relates to a plate heat exchanger for treatment of a feed. The plate heat exchanger includes a plate package comprising a plurality of heat exchanging plates and defining a heating volume, a cooling volume and a plurality of process volumes. Each of the process volumes includes an evaporation section for evaporation of a part of the feed, a separation section for separating a non-evaporated part from an evaporated part of the feed, and a condensation section being arranged to condense the evaporated part of the feed. Each heat exchanging plate defines a first thermal interface between the heating volume and the evaporation section of a first process volume, a second thermal interface between the cooling volume and the condensation section of a second process volume, and at least one further thermal interface between an evaporation section and a condensation section of two adjacent process volumes.

19 Claims, 13 Drawing Sheets

(51) Int. Cl.
*B01D 1/30* (2006.01)
*B01D 3/02* (2006.01)
*B01D 5/00* (2006.01)
*C02F 1/08* (2023.01)
*F28D 9/00* (2006.01)
*F28F 3/08* (2006.01)
*F28F 3/10* (2006.01)
*C02F 1/04* (2023.01)
*C02F 103/08* (2006.01)
*F28D 21/00* (2006.01)

(52) U.S. Cl.
CPC .............. *F28D 9/005* (2013.01); *F28F 3/086* (2013.01); *F28F 3/10* (2013.01); *C02F 1/048* (2013.01); *C02F 2103/08* (2013.01); *F28D 21/00* (2013.01); *F28F 2021/0066* (2013.01); *F28F 2210/10* (2013.01)

(58) Field of Classification Search
USPC .......................................... 422/305; 202/174
See application file for complete search history.

(56) References Cited

U.S. PATENT DOCUMENTS

| | | | |
|---|---|---|---|
| 2012/0055776 A1* | 3/2012 | Feher | B01D 5/0027 202/174 |
| 2016/0298874 A1 | 10/2016 | Lovascio et al. | |

FOREIGN PATENT DOCUMENTS

| | | | |
|---|---|---|---|
| CN | 203820488 U | 9/2014 | |
| CN | 105481159 A | 4/2016 | |
| CN | 106587227 A | 4/2017 | |
| CN | 106643238 A | 5/2017 | |
| CN | 106830151 A | 6/2017 | |
| CN | 206262115 U | 6/2017 | |
| CN | 206648507 U | 11/2017 | |
| CN | 206720784 U | 12/2017 | |
| EP | 1650166 A1 | 4/2006 | |
| JP | H04-244202 A | 9/1992 | |
| JP | H05-501913 A | 4/1993 | |
| JP | 2008-534906 A | 8/2008 | |
| KR | 101146106 B1 | 5/2012 | |
| RU | 2423656 C2 | 7/2011 | |
| RU | 2623351 C1 | 6/2017 | |
| SE | 464938 B | 7/1991 | |
| WO | 9106817 A1 | 5/1991 | |
| WO | 2006104443 A1 | 10/2006 | |
| WO | 2007/071796 A1 | 6/2007 | |

OTHER PUBLICATIONS

English Translation of the Office Action (Decision to Grant) issued Jun. 24, 2021 by the Federal Service for Intellectual Property (ROSPATENT) in corresponding Russian Patent Application No. 2020143240/(080661). (8 pages).

English Translation of the Office Action (Notice of Reasons for Rejection) issued Jan. 24, 2022, by the Japanese Patent Office in corresponding Japanese Patent Application No. 2020-567793. (7 pages).

International Search Report (PCT/ISA/210) and Written Opinion (PCT/ISA/237) mailed on Aug. 8, 2019, by the European Patent Office as the International Searching Authority for International Application No. PCT/EP2019/064474.

* cited by examiner

PLATE HEAT EXCHANGER, A HEAT EXCHANGING PLATE AND A METHOD OF TREATING A FEED SUCH AS SEA WATER

CROSS-REFERENCE TO RELATED APPLICATIONS

This application is a U.S. national stage application based on International Patent Application No. PCT/EP2019/064474, filed Jun. 4, 2019, which claims priority to European Patent Application No. 18176540.5, filed Jun. 7, 2018.

The present invention relates to a plate heat exchanger, a heat exchanging plate and a method of treating a feed such as sea water.

INTRODUCTION

Equipment for desalination of seawater, where one or several plate packages of heat exchanging plates form the main components in the process, have been manufactured since many years. SE-B-464 938 discloses such a desalination plant comprising a plate package provided in a cylindrical container. The heat exchanging plates have no ports for steam, but instead the space outside the heat exchanging plates is used as flow paths for the steam, depending on the kind of process. The process used is based on the so-called falling film technology in which a film of water is distributed across the width of the plates and run downwardly on the plates. In a plate evaporator of the falling film type, every second plate interspace constitutes an evaporation space whereas the rest of the plate interspaces constitute spaces for a heat emitting medium. The container is a substantially cylindrical pressure vessel. In a large plant including several plate packages, these may be arranged in the longitudinal direction of the cylinder. To a certain extent, the container is limiting for the size of the plant, if not several containers may be included in the plant.

To improve the efficiency of the plant, it may be provided with multiple stages. One examples of a multi stage desalination plant may be found in U.S. Pat. No. 5,133,837 which discloses a multi stage flash evaporator in which the sea water to be evaporated is passed into a bottom chamber of each stage vessel, with vapor flowing upwardly through demisters and channels, into contact with the dimpled plates, and the condensate falling as a thin film down the plates and collecting in the condensate trough. U.S. Pat. No. 6,635,150 discloses a distilling plant which is made up of plural cascades of elementary cells alternatively assembled in thermal series.

At least for smaller or medium sized plants, the cost for the container is a large part of the total cost for the plant. The manufacturing and mounting of the container are both complex and time consuming. In addition, maintenance of the plant and cleaning of the heat exchanging plates are difficult, for instance since the plate package and the heat exchanging plates only are accessible after opening of the container.

The solution to the above problem may be found in the international application WO 2006/104443 A1 assigned to the Alfa Laval Corporate AB. It discloses a plate heat exchanger for desalination. The heat exchanger has an evaporation section, a separation section and a condensation section. The advantage of the above-mentioned heat exchanger is that it does not need any container since the whole treatment of the seawater is performed in the plate package.

The above-mentioned technology is only using a single stage. However, the efficiency of the heat exchanger could be improved by using multiple stages. Thus, it is the object of the present invention to provide a plate heat exchanger for desalination without the need for a container but including multiple stages.

SUMMARY OF THE INVENTION

The above object is achieved in a first aspect by a plate heat exchanger for treatment of a feed such as sea water, the plate heat exchanger including a plate package comprising a plurality of heat exchanging plates arranged in a successive order, the plate package defines a heating volume for receiving a heating medium, a cooling volume for receiving a cooling medium and a plurality of process volumes, each of the volumes being fluidly separated from each other in the plate package, each of the process volumes includes:
  an evaporation section being arranged to permit evaporation of at least a part of the feed,
  a separation section being arranged to separate a non-evaporated part of the feed from an evaporated part of the feed, and
  a condensation section being arranged to condense the evaporated part of the feed,
wherein each heat exchanging plate defines a first thermal interface between the heating volume and the evaporation section of a first process volume of the plurality of process volumes, a second thermal interface between the cooling volume and the condensation section of a second process volume of the plurality of process volumes, and at least one further thermal interface between an evaporation section and a condensation section of two adjacent process volumes.

The present heat exchanger is used for treatment of a feed. The feed is typically a liquid medium. The feed is primarily sea water and the treatment typically is in the form of desalination of sea water to achieve fresh water, however, other related applications are not excluded and some such relates applications will be discussed in the detailed description. The heat exchanging plate package comprises a plurality of heat exchanging plates of substantially equal size which are placed successively face to face, typically along a horizontal direction. Each heat exchanging plate defines substantially the full height and width of the heat exchanger package, and the horizontal direction constitutes the depth of the heat exchanger package. The edges of the heat exchanging plates are mutually sealed to establish parallel plate interspaces between the plates. The heat exchanging plates define surfaces of different type and when assembled facing each other two kinds of plate interspaces, i.e. first and second plate interspaces, are provided in alternating order, i.e. a first plate interspace is located adjacent two second plate interspaces, except of course the first and the last plate interspace along the horizontal direction.

The process volumes are also substantially sealed with respect to each other and are accommodated in the plate interspaces. The process volumes constitute separate spaces within the plate interspaces. All process volumes are formed on each plate. Of course, inlets and outlets exist in the process volumes, e.g. for introducing feed for evaporation and removing fresh water and brine, respectively. Brine is here understood to mean water having a higher salinity than sea water. The plates are typically bolted together in the plate package for the plates to be removable for maintenance. The heat exchanging plates are typically made of thermally conductive corrosion resistant materials such as stainless steel, aluminium or titanium.

The feed, which typically constitutes sea water, is introduced into the plate package at the evaporation section of each process volume where at least a part of the feed is evaporated using a hot fluid on the opposite side of the heat exchanging plates. The separation section, which is located adjacent or above the evaporation section, separates the evaporated part of the feed from the remaining part which essentially consisting of non-evaporated feed, i.e. brine. The separation section typically comprises rods, bars or corrugation etc. on which the non-evaporated feed gets trapped and is led out of the separation section. The condensation section allows the evaporated feed to condensate using a cool substance on the opposite side of the heat exchanging plates. The condensed feed such as fresh water is led out of the heat exchanger package.

Each heat exchanging plate in the plate package defines thermal interfaces for exchanging of heat between the spaces on each side of the heat exchanging plate. The thermal interface allows thermal contact through the plate by using a metal such as stainless steel, aluminium or titanium, however, fluid mixing is prevented. The evaporation section of the first process volume receive heating from a heating volume via the first thermal interface. In the heating volume a heating medium is circulating. The heating medium may e.g. be a liquid such as jacket water from a ship engine or similar heated water from any other heat source such as hot oil. It can also be a gas such as steam and vapour. The condensation section of the second process volume receives cooling from a cooling volume via a second thermal interface on the heat exchanging plate. In the cooling volume a cooling medium is circulating. The cooling medium is typically a liquid such as naturally cool water, preferably sea water. Alternatively, other cooling medias may be used. Thus, each plate is contacting and forming a barrier between all the different volumes of the plate package and all process stages can be performed on the same plate. This allows for a compact design.

Each heat exchanging plate also defines at least one further thermal interface between the evaporation section and the condensation section of two adjacent process volumes. For instance, in case of two process volumes, the condensation section of the first process volume is located adjacent and in thermal relationship with the evaporation volume of the second process volume. In case of more than two process volumes, the condensation section is located adjacent and in thermal relationship with the evaporation section of the next higher process volume, such that the condensing energy of the lower process volume may be used as evaporation energy for the next higher process volume. In this way energy is conserved. Each process volume may be considered to be a process stage.

The pressure in the process volumes may be adjusted to allow the feed to evaporate in the evaporation sections and to condensate in the condensation sections at suitable temperatures According to a further embodiment of the first aspect the plate package defines at least two process volumes, preferably 3, 4, 5, 6, 7, 8, 9 or 10 process volumes being arranged such that two adjacent process volumes define a thermal interface between respective adjacent condensation and evaporation sections.

The process volumes are thus thermally connected in thermal series meaning that the condensation section is in thermal connection with the evaporation section of the neighbouring process volume. The number of process volumes may in principle be infinite, however, since the process volumes in practice all operate in different temperature and pressure ranges, the number of process volumes are limited. In practice the number may be limited to those mentioned above. Each process volume except the first, utilize the energy from the adjacent process volume and thus the energy saving increase by the number of added volumes According to a further embodiment of the first aspect, the heat exchanging plates are compression moulded.

In this way the surface structure of the plates may be made corrugated to increase the surface areas and thereby the heat transfer.

According to a further embodiment of the first aspect, the pressure and the temperature in the second process volume is lower than in the first process volume.

For the condensation section of the first volume to be able to heat the evaporation section of the second volume and be able to evaporate the feed in the second volume while condensing the feed of the first volume, the pressure and the temperature in the first process volume should be higher than the pressure and the temperature in the second process volume.

The principle is the same when using more than two process volumes, i.e. using more than two process stages. The pressure and temperature in the adjacent higher process volume is lower than in the adjacent lower process volume. In other words, the pressure and the temperature decrease from the first process volume through the optional intermediate process volumes to the second volume. An equilibrium is thereby formed.

According to a further embodiment of the first aspect, the process volumes are fluidly separated from each other by means of a gasket.

By using a gasket, e.g. a rubber gasket, the plate packages may be properly sealed while still allowing the individual heat exchanging plates of the plate package to be easily separated, i.e. allowing the removal of one of more heat exchanging plates for cleaning and/or maintenance. Further, the use of a gasket eliminates the need for a tank for accommodating the plates.

According to a further embodiment of the first aspect the evaporation section comprise a feed inlet located at the top of the evaporation section.

The above configuration implies using the so-called falling film technique in which the feed is fed from above into the evaporating section of each interface.

According to a further embodiment of the first aspect, the evaporation section comprise a feed inlet located at the bottom of the evaporation section.

The above configuration implies using the so-called rising film technique in which the feed is fed from below into the evaporating section of each interface. Thus, typically, the inlet for the feed is a small hole at the bottom part of the evaporation sections. Part of the feed is evaporated and rises to the condensation section, where it is condensed.

According to a further embodiment of the first aspect, each of the process volumes comprises a feed inlet located at the bottom of the evaporation section and a non-evaporated feed outlet located below the separation section when the plate package is disposed in a normal position of use.

The feed inlet is used for introducing the feed, e.g. sea water, into the evaporation section. In this way feed may be efficiently introduced into the evaporation sections of each of the process spaces. The non-evaporated feed outlet is used for removing the non-evaporated feed constituting brine or other concentrate, from the separation sections of each of the process spaces.

According to a further embodiment of the first aspect, the feed inlet is located adjacent a centre axis of each heat exchanging plate for at least one process volume of the plurality of process volumes other than the first process volume.

The centre axis extending substantially centrally between two side edges of each heat exchanging plate and substantially vertically when the plate package is disposed in a normal position of use. In this way a single central inlet conduit for the feed for each process volume other than the first may be used instead of two separate conduits at the opposite plate edges as used in the first process volume. In the first process volume, the inlet and outlet of the heating section are normally centrally located making a centrally located inlet conduit non-feasible. One conduit is therefore saved per process volume other than the first. Further, not having the feed inlet at the edge of the plate allows more space for the evaporation.

According to a further embodiment of the first aspect, the non-evaporated feed outlet is located adjacent a centre axis of each heat exchanging plate for at least one process volume of the plurality of process volumes other than the first process volume.

The centre axis extending substantially centrally between two side edges of each heat exchanging plate and substantially vertically when the plate package is disposed in a normal position of use. A centrally located non-evaporated feed outlet may be beneficial for removing brine due to the roll on board a ship. Further, not having the non-evaporated feed outlet at the edge of the plate will allow more space on the plate for passage of evaporated feed.

According to a further embodiment of the first aspect at least one heat exchanging plate define one or more apertures at the separation section of at least one process volume.

In this way the feed may flow on both sides of the plate, thus increasing the active surface area for the separation of the evaporated part of the feed and the non-evaporated part of the feed.

According to a further embodiment of the first aspect the evaporation section and the condensation section are arranged in the same plate interspace for at least one process volume and/or, the evaporation section and the condensation section are arranged in opposite plate interspaces for at least one process volume.

The plate interspace is defined as the space enclosed by two adjacent heat exchanging plates. The position of the evaporation and condensation sections may be varied.

According to a further embodiment of the first aspect, during use the condensation section of the second process volume is disposed above the evaporation section of the first process volume and within each process volume the evaporation section is disposed below the separation section and the separation section is disposed below the condensation section.

The sea water is fed into the evaporation section via the feed inlet. The sea water for the feed inlet may be taken from the cooling water for the feed to be pre-heated. In this way less energy is used for the heating of the feed. The concentrate outlet connection of the separation section receives the non-evaporated part of the feed. The fresh water outlet collects the condensed fresh water from the condensation stage and leads it out of the plant.

According to a further embodiment of the first aspect, the number of heat exchanging plates is in the range of 4-1000 heat exchanger plates, such preferably as in the range of 10-100.

The number of plates may be varying depending on the desired output of the heat exchanger.

According to a further embodiment of the first aspect the heat exchanger further comprising a pair of end plates covering two opposing sides of the plate package.

The end plates are used together with bolts to retain the internal pressure of the plate package and ensure that the correct assembly length is achieved and maintained. They also contribute to achieving additional stability. They may be made thicker and more rigid than the heat exchanging plates which are made thin to increase the heat transfer.

The plate package may include opposite end plates for increased stability.

The above object is achieved in a second aspect by method of manufacturing a heat exchanger for treating a feed such as sea water, the method comprising:
  providing a plurality of heat exchanging plates, each heat exchanging plate defines a first thermal interface, a second thermal interface and at least one further thermal interface, and
  forming a plate package by arranging the plurality of heat exchanging plates in a successive order, wherein the plate package define a heating volume for receiving a heating medium, a cooling volume for receiving a cooling medium and a plurality of process volumes, each of the volumes being fluidly separated from each other in the plate package, each of the process volumes includes:
    an evaporation section being arranged to permit evaporation of at least a part of the feed,
    a separation section being arranged to separate a non-evaporated part of the feed from an evaporated part of the feed, and
    a condensation section being arranged to condense the evaporated part of the feed,
  wherein the first thermal interface is defined between the heating volume and the evaporation section of a first process volume of the plurality of process volumes, the second thermal interface is defined between the cooling volume and the condensation section of a second process volume of the plurality of process volumes, and at least one further thermal interface is defined between an evaporation section and a condensation section of two adjacent process volumes.

The above method according to the second aspect may preferably be used together with any of the above embodiments of the plate heat exchanger according to the first aspect.

The above object is achieved in a third aspect by a plate for a plate heat exchanger for treatment of a feed such as sea water, the plate heat exchanger including a plate package comprising a plurality of heat exchanging plates arranged in a successive order, the plate package defines a heating volume for receiving a heating medium, a cooling volume for receiving a cooling medium and a plurality of process volumes, each of the volumes being fluidly separated from each other in the plate package, each of the process volumes includes:
  an evaporation section being arranged to permit evaporation of at least a part of the feed,
  a separation section being arranged to separate a non-evaporated part of the feed from an evaporated part of the feed, and
  a condensation section being arranged to condense the evaporated part of the feed,
  wherein each heat exchanging plate defines a first thermal interface between the heating volume and the evaporation section of a first process volume of the plurality of process volumes, a second thermal interface between the cooling volume and the condensation section of a second process volume of the plurality of process volumes, and at least one further thermal interface between an evaporation section and a condensation section of two adjacent process volumes.

In this way is realized a heat exchanging plate for a heat exchanger for treating of a feed such as sea water, the heat exchanging plate defines a first thermal interface for separating a heating volume and an evaporation section of a first process volume, a second thermal interface for separating a cooling volume and a condensation section of a second process volume, and at least one further thermal interface between an evaporation section and a condensation section of two adjacent process volumes.

The above heat exchanging plate according to the third aspect may preferably be used together with any of the above embodiments of the plate heat exchanger according to the first aspect and/or with any of the above embodiments of the method according to the first aspect.

The plate package may be made up of a single plate type. Every other plate in the plate package is then turned 180 degrees to establish two plate interspaces of different type. Alternatively, the plate package may be made up of a plurality of plate types, such as two plate types, which are assembled in an alternating order in the plate package.

DETAILED DESCRIPTION OF THE DRAWINGS

Figure 1:
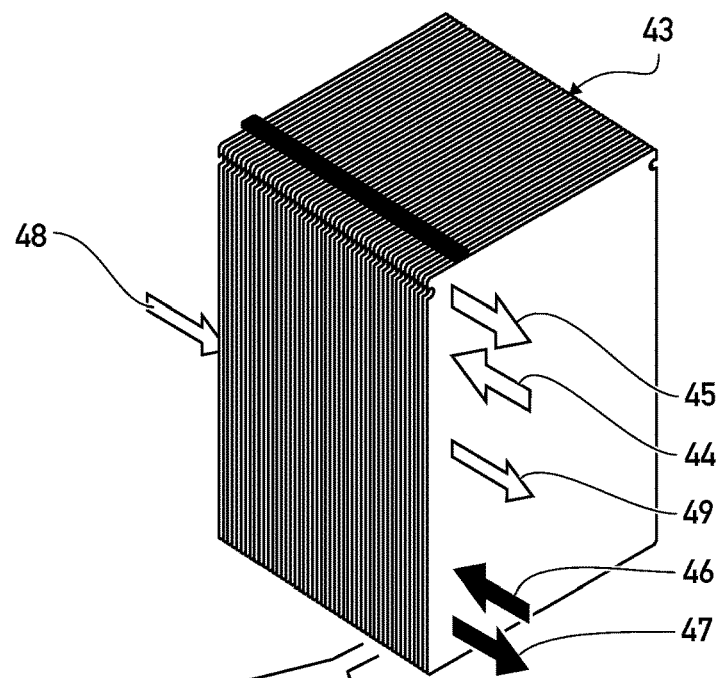
FIG. 1 shows a plate package according to the present invention using the rising film technique.

FIG. 1 shows a plate package according to the present invention. The plate package includes a plurality of heat exchanging plates 43. The plates 43 may e.g. be made of stainless steel, aluminium or titanium. The ports have been schematically illustrated by arrows. Port 44 is an inlet port for cooling medium. Port 45 is an outlet port for cooling medium. Port 46 is an inlet port for heating medium. Port 47 is an outlet port for heating medium. Port 48 is an inlet port for the feed. The feed is primarily sea water when the plate package is used in a desalination plant, however, other feeds are possible, such as raw fruit juice in case of a plant for producing fruit concentrate. The feed may also be taken from the outlet port for cooling medium 45. Port 49 is an outlet port for treated feed, such as fresh water in the case of a desalination plant.

Figure 2:
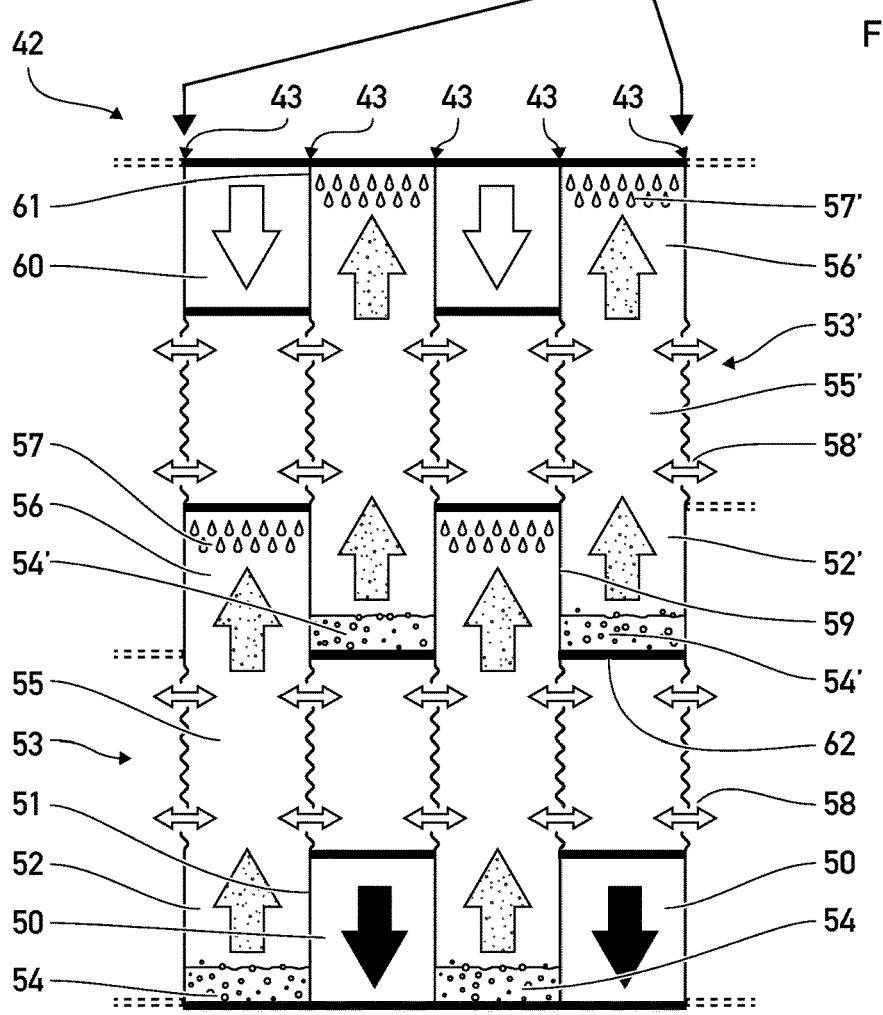
FIG. 2 shows a cross section view of the above plate package.

FIG. 2 shows a cross section view of the plate package 42. Hot fluid, such as jacket water in case the plant is located on a ship, is circulated in a heating volume 50. The plates 43 form a thermal interface 51 between the heating volume 50 and an adjacent evaporation section 52 of a first process volume 53. The feed 54 is introduced into the lower part of the evaporation section 52 of the first process volume 53. The feed is heated by the heating medium in the heating volume 50 through the thermal interface 51 such that a part of the feed 54 is evaporated forming a vapour, typically being steam in case of an aqueous feed in e.g. a desalination plant. The steam is moving upwards as shown by the arrows and enters a separation section 55 of the first process volume 53. In the separation section 55, any non-evaporated feed is removed. The steam then enters a condensation section 56 of the first process volume 53. In the condensation section 56, the steam is condensed into a condensate 57, which constitutes fresh water. The fresh water is led out through the fresh water outlet port. Passages 58a/b are formed through the plate 43 in the separation section 55.

At the condensation section 56 of the first process volume 53 the plates 43 form a thermal interface 59 with an adjacent evaporation section 52' of a second process volume 53'. The feed 54' is introduced into the lower part of the evaporation section 52' of the second process volume 53'. In the second process volume 53' the pressure and temperature is lower than in the first process volume 53. The feed 54' in the second process volume 53' will thus evaporate (and condensate) at a lower temperature than the feed 54 in the first processing volume 53. The feed 54' is heated by the condensation section 56 of the first process volume 53 through the thermal interface 59 such that the feed 54' is evaporated to steam while the steam in the condensation section 56 of the first process volume 53 is condensed into water.

The steam in the second process volume 53' is moving upwards as shown by the arrows and enters a separation section 55' of the second process volume 53'. In the separation section 55', any non-evaporated feed is removed. The steam then enters a condensation section 56' of the second process volume 53'. In the condensation section 56', the steam is condensed into a condensate 57', which constitutes fresh water. The fresh water is led out through the fresh water outlet port. Passages 58a/b are formed in the plate 43 in the separation section 55.

A cooling volume 60 is provided at the top of the plate package. In the cooling volume 60, the cooling medium is circulated. The cooling medium cools the condensation section 56' of the second process volume 53' via a thermal interface 61 in the plates 43.

The non-evaporated feed constitutes a brine having an elevated salinity and which is led out of the plate package. In other applications, the non-evaporated feed may be the product, e.g. in case of a plant for producing juice concentrate, the feed is raw fruit juice and the non-evaporated feed constitutes the juice concentrate.

The thick black lines 62 form gaskets which encloses the plate interspaces and separate the volumes. The ports and passages interconnect the plate interspaces such that the plate interspaces of the heating volume, cooling volume, first process volume and second process volume each form respective interconnected spaces.

Figure 3A:
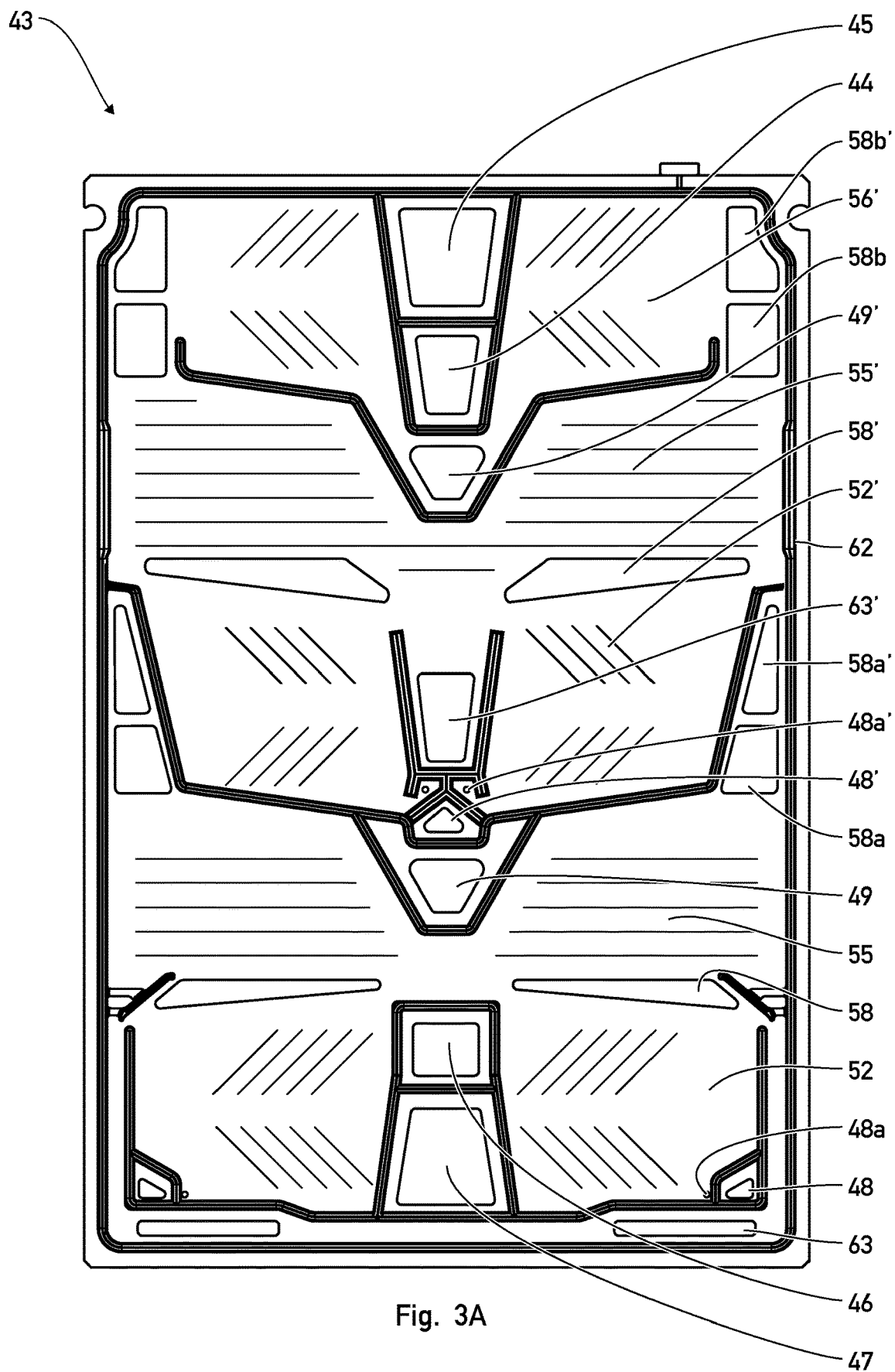
FIG. 3A shows a front view of one of the plates of the above plate package.

FIG. 3A shows a front view of one of the plates 43 of the plate package. The ports 44 45 for the cooling medium and the ports 46 47 for the heating medium are sealed off the present side of the plate, defining a first plate interspace. The feed from the port 48 enters the evaporation section 52 via an inlet hole 48a in the first process volume. The evaporated steam flows to the separation section 55 located above the evaporation section 52 and through the plate 43 via passages 58a/b to the neighbouring plate interspace. The passage 58a thereby ensures that the evaporated feed reaches both sides of the plate 43, whereas the passages 58b are there to lead the vapor in to the interspace where the condensation takes place. Non-evaporated feed flows out via the non-evaporated feed outlet port 63. The non-evaporated feed constitutes brine in a desalination plant but may alternatively constitute a product concentrate such as juice concentrate. The condensation section of the first process volume is located on the opposite side of the plate and is thus not shown in the present view.

Figure 4A:
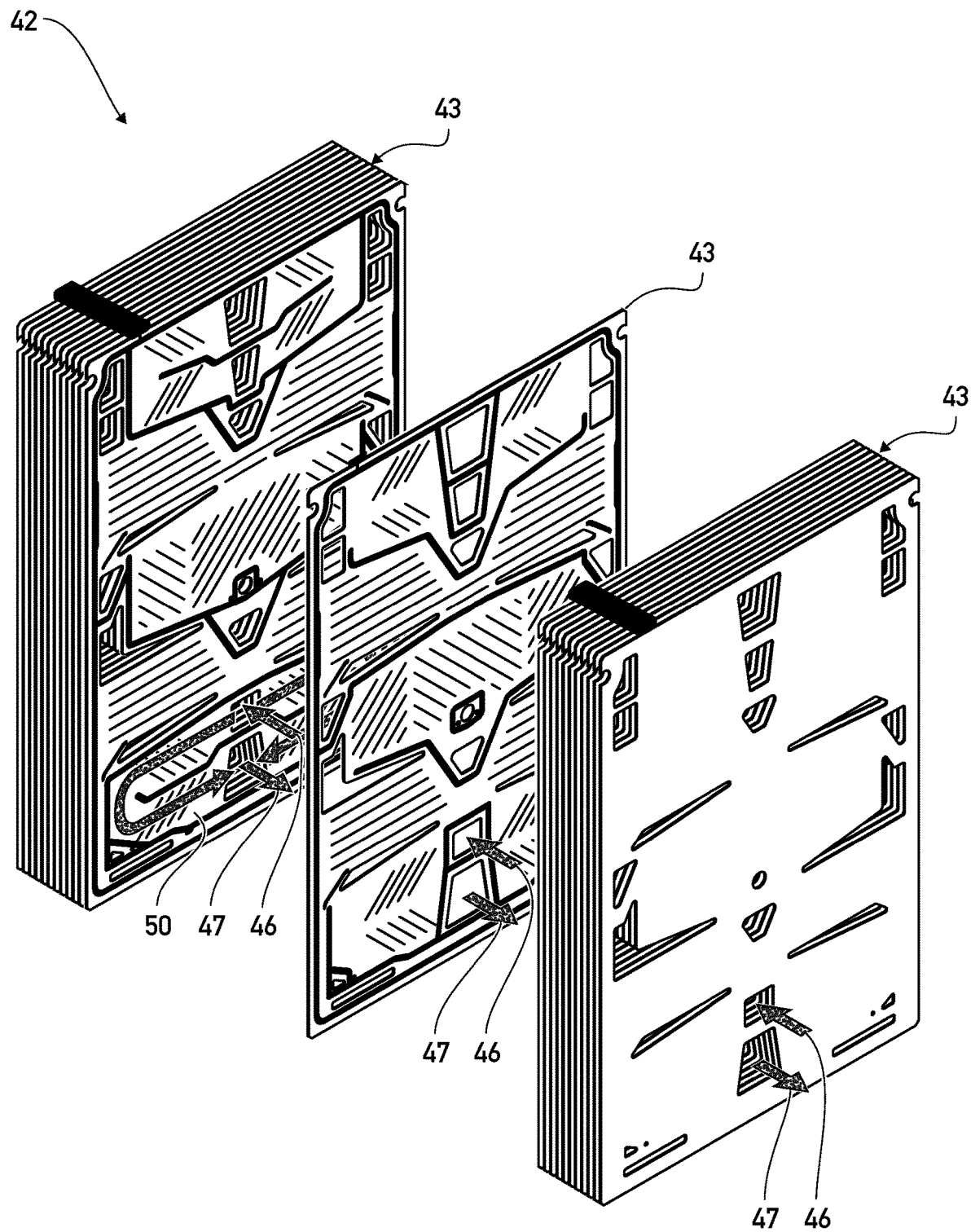
FIG. 4A shows the working principle of the heating volume.
Figure 4B:
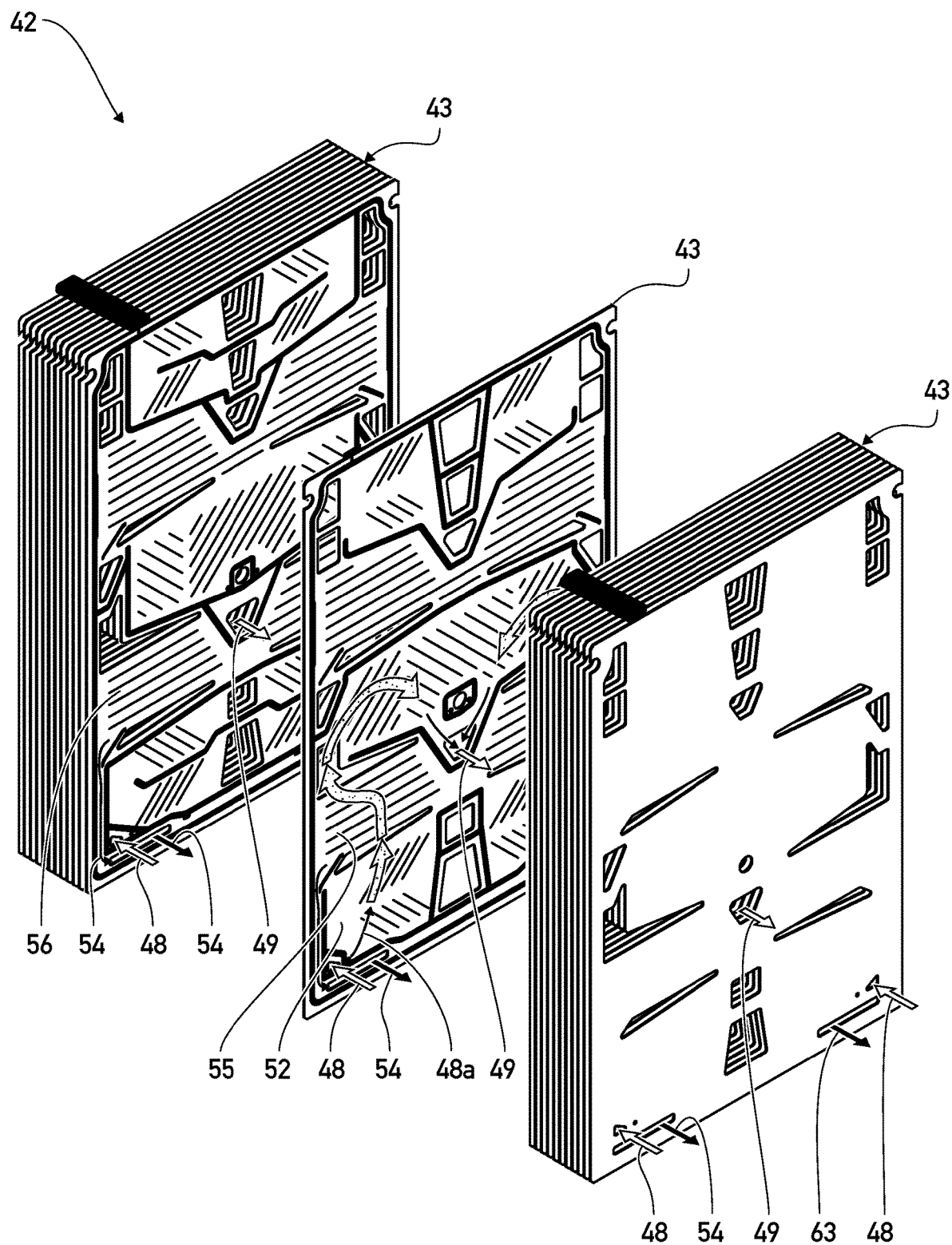
FIG. 4B shows the working principle of the first process volume.

Evaporation is also taking place in the evaporation section 52' of the second process volume using heat from an opposite condensation section of the first process volume (described in relation to FIG. 4B). The feed is introduced into the evaporation section 52' of the second process volume via port 48' and hole 48a'. The evaporated steam flows through a separation section 55' of the second process volume to a condensation section 56' of the second process volume where the steam condenses into water. The fresh water leaves the condensation section 56' via the port 49'.

The port 48' for introducing feed into the second process volume is centrally located on the plate 43. In this way the number of feed inlet connections in the second process volume is reduced from 2 to 1 compared to the first process volume. This results in a reduction of piping and cutting costs, and it allows for a better utilisation of the plate area. Further, not having the feed inlet at the edge of the plate allows more space for the evaporation.

Further, the non-evaporated feed outlet port 63' for the second process volume is also centrally located on the plate 43. In this way, the number of non-evaporated feed outlet connections in the second process volume is as well reduced from 2 to 1 compared to the first process volume, and, not having the non-evaporated feed outlet at the edge of the plate will allow more space on the plate for more space for the evaporation and the passage of evaporated feed. A centrally located non-evaporated feed outlet may be beneficial due to the roll on board a ship.

Figure 3B:
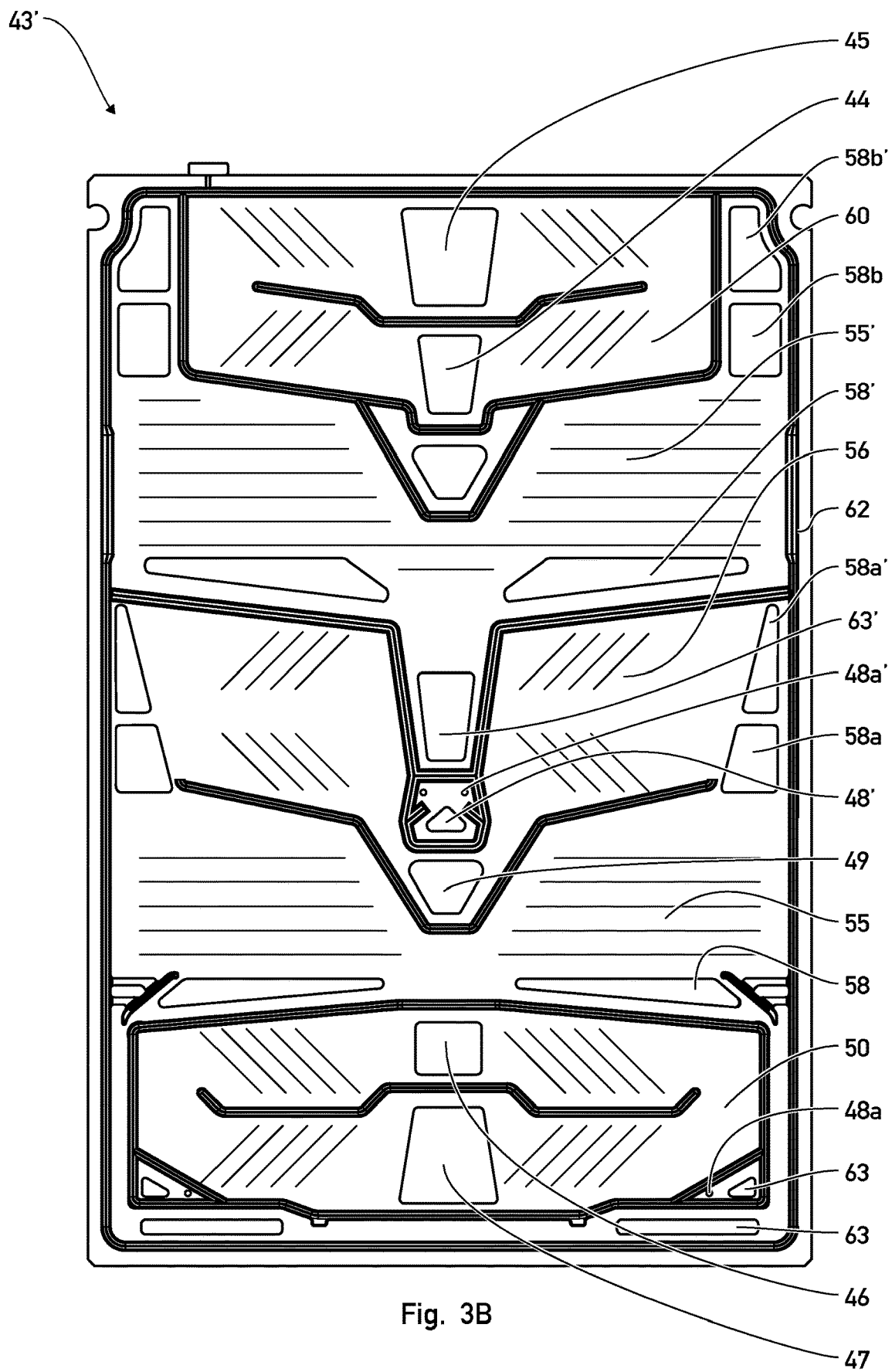
FIG. 3B shows a rear view of the above-mentioned plate of the plate package.

FIG. 3B shows a rear view of the above-mentioned plate 43' of the plate package. Here, heating medium is circulating in the heating volume 50 for heating the opposite evaporation section of the first process volume, and cooling medium is circulating in the cooling volume 60 for cooling the opposite condensation section of the second process volume.

The condensation section 56 is heating the evaporation section of the second process volume located on the opposite side of the plate. Steam from the evaporation section of the first process volume is received through the passages 58b in the separation section 55 of the first process volume. The fresh water leaves the condensation section 56 via the port 49. The gasket 62 is represented by the thick black line.

FIG. 4A shows a plate package 42 according to another embodiment of the present invention. The present view illustrates with arrows the introduction of heating medium into the plate package and the circulation of the heating medium in the plate interspaces at the heating volume 50.

FIG. 4B shows the plate package 42 of FIG. 4A. The present view illustrates with arrows the introduction of the feed into the plate package at the port 48 in the first process volume. The feed enters the evaporation section 52 of the first process volume and evaporates due to the heat from the opposite heating volume. The evaporated feed continues to the separation section 55 where the non-evaporated parts are removed. The remaining steam or vapour condenses at the condensation section and the resulting water or liquid is led out through the port 49. The non-evaporated feed (brine/concentrate) is led out though the non-evaporated feed outlet port 63.

Figure 4C:
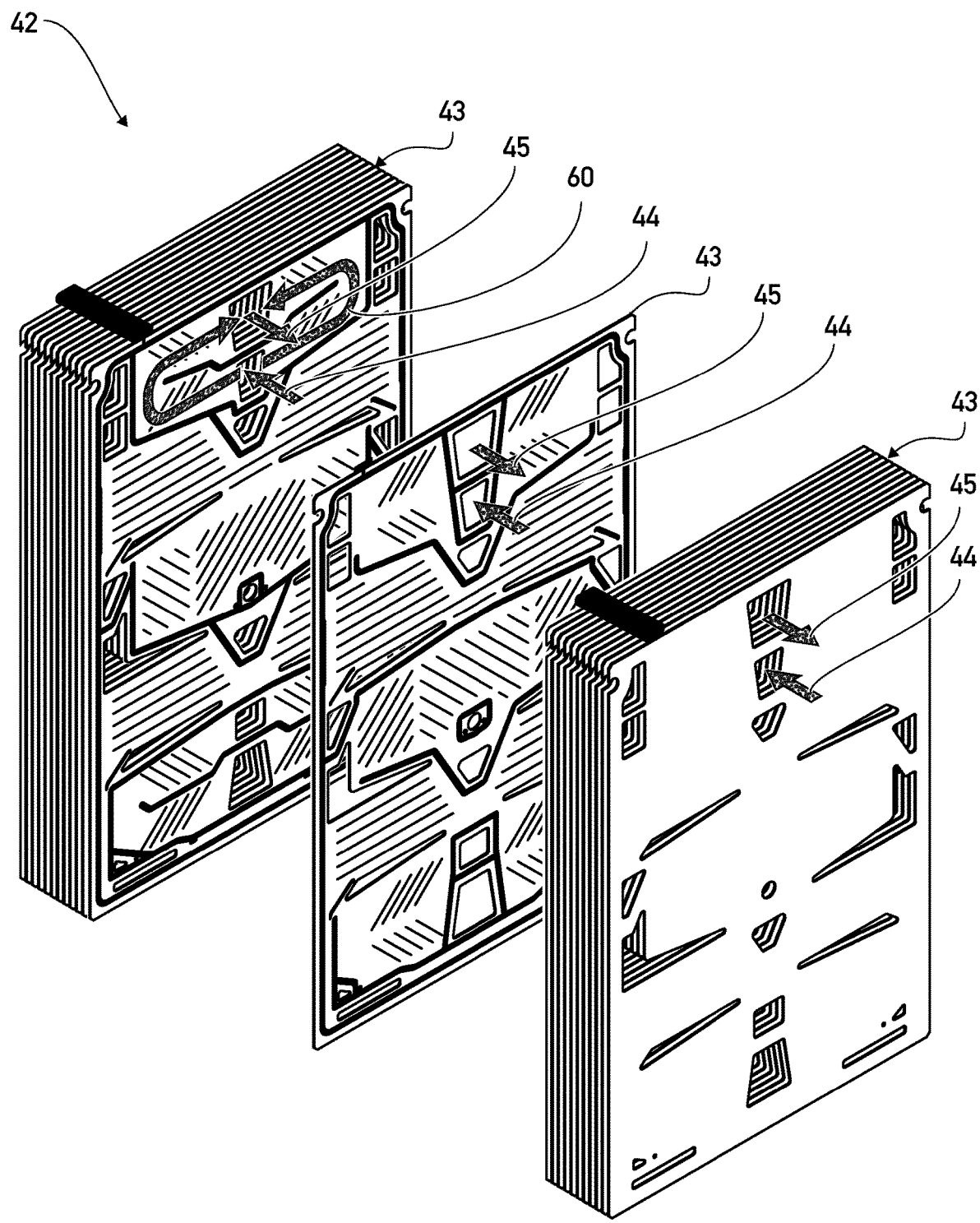
FIG. 4C shows the working principle of the cooling volume.

FIG. 4C shows a plate package 42 of FIG. 4A. The present view illustrates with arrows the introduction of cooling medium into the plate package and the circulation of the cooling medium in the plate interspaces at the cooling volume 60.

Figure 4D:
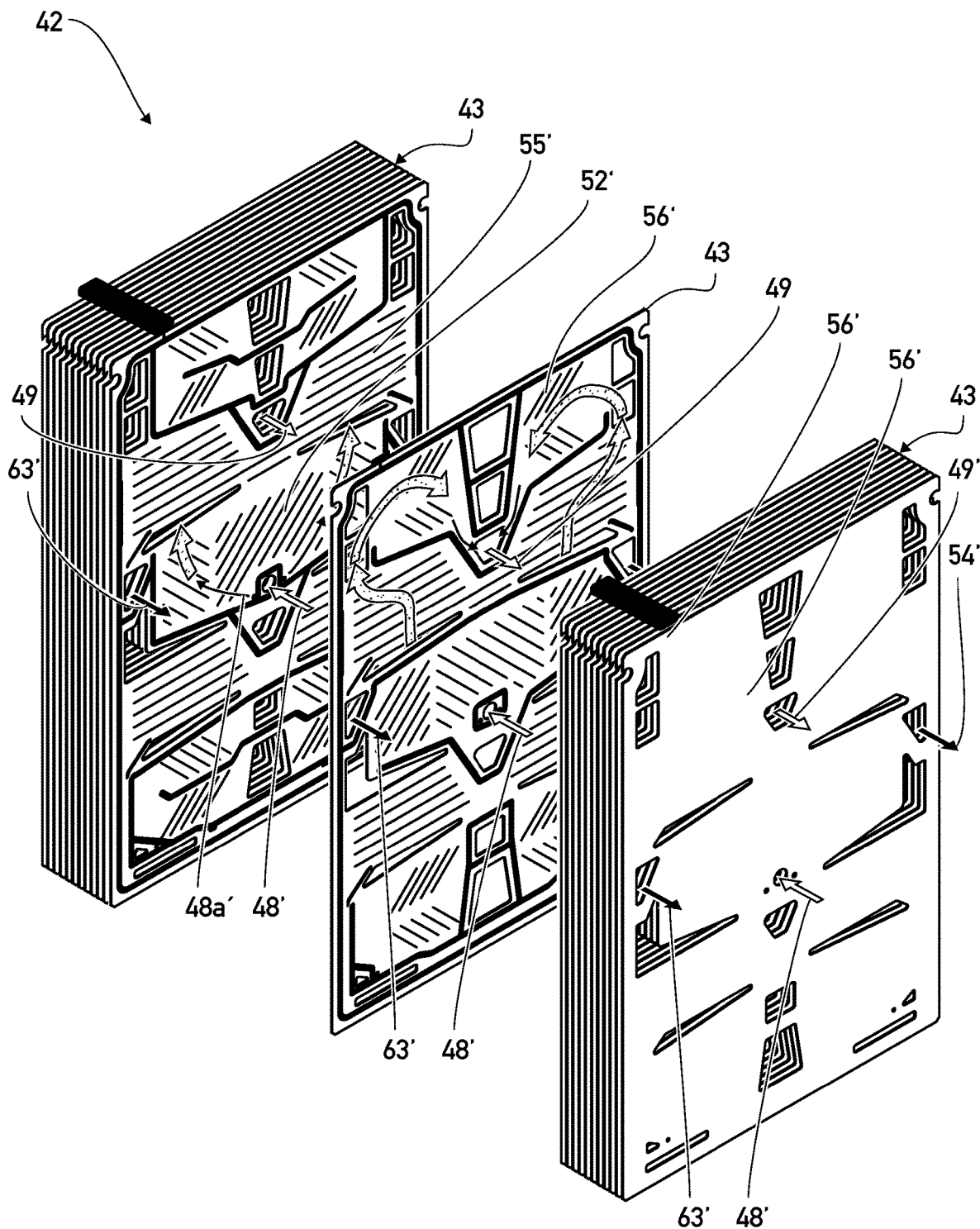
FIG. 4D shows the working principle of the second process volume.

FIG. 4D shows a plate package 42 of FIG. 4A. The present view illustrates with arrows the introduction of feed into the plate package at the port 48' in the second process volume. The feed enters the evaporation section 52' of the second process volume and evaporates due to the heat from the opposite condensation section of the first volume. The pressure and temperature in the evaporation section of the second process volume is lower than in the condensation section of the first volume so that condensation and evaporation may take place. The evaporated feed continues to the separation section 55' where the non-evaporated parts of the feed are removed. The remaining steam or vapour condenses at the condensation section 56' and the resulting water or liquid is led out through the port 49. The non-evaporated part of the feed, e.g. the brine or concentrate, is led out though the non-evaporated feed outlet port 63'.

Figure 5A:
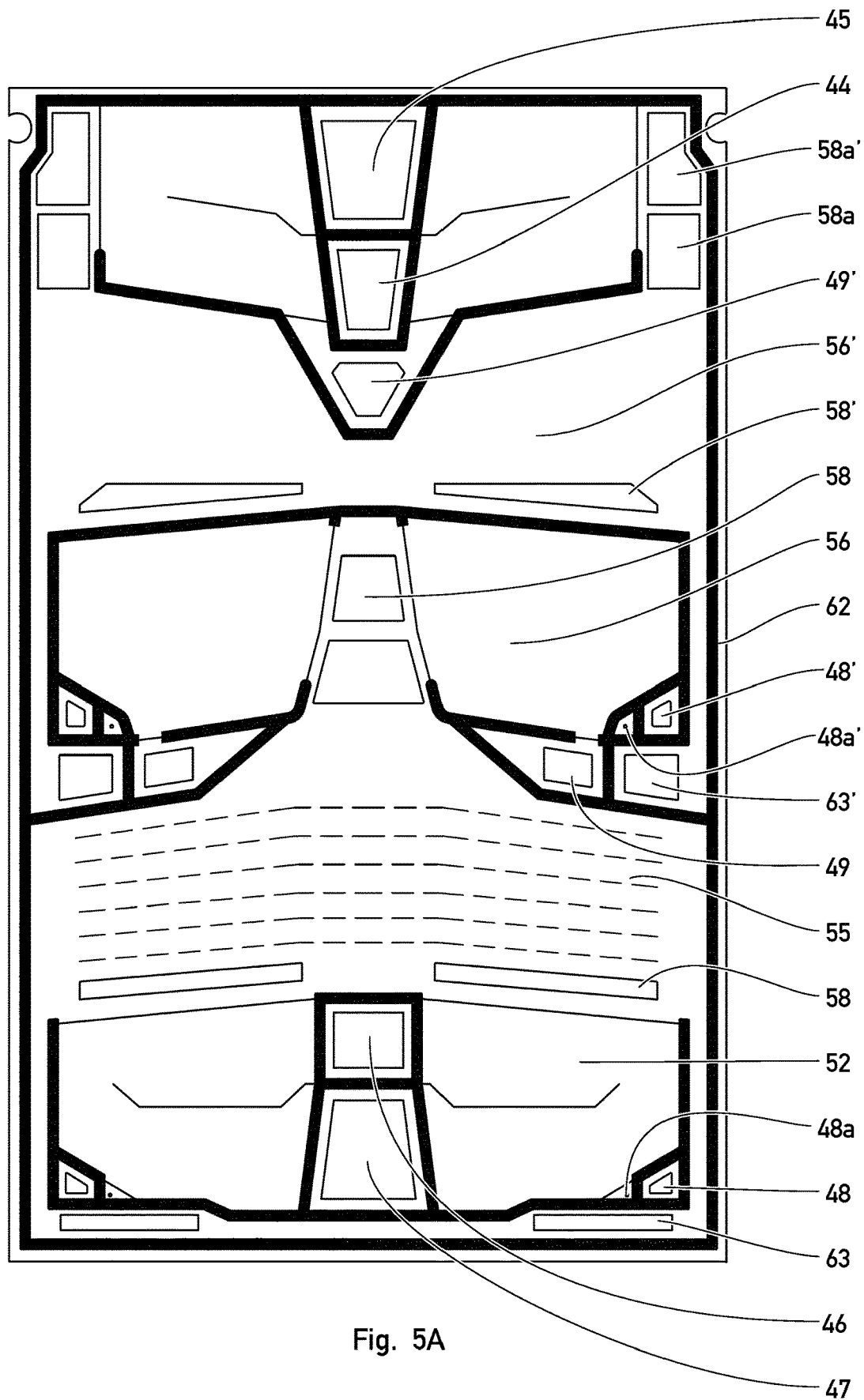
FIG. 5A shows a front view of an alternative plate having no central outlet in the thermal intersection between two adjacent process volumes.

FIG. 5A shows a front view of an alternative plate for an alternative plate package. The sole difference between the front of the present plate and the front of the previous plate is that in the first process volume, there are passages 58a/b located centrally on the plate, whereas the fresh water is collected at two ports 49 located at the edge of the plate. In this way it is avoided to have port located in the thermal intersection between two adjacent process volumes of the plate package. Having a port located there would require a hole in the end plate which would make the end plate weaker.

Figure 5B:
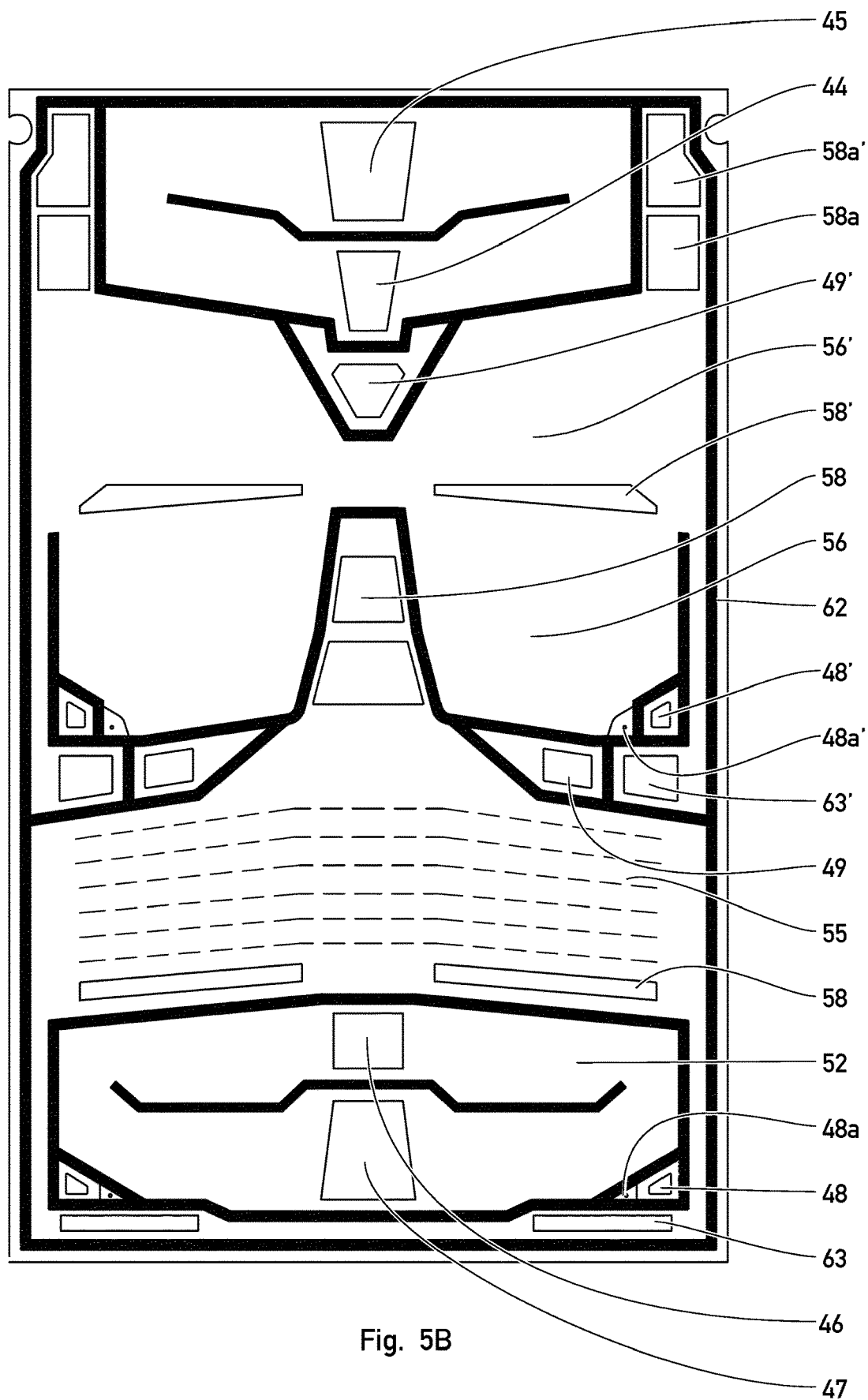
FIG. 5B shows a rear view of the above mentioned alternative plate.

FIG. 5B shows a rear view of the above mentioned alternative plate of the alternative plate package. The functional principle of the rear side of the present plate is identical to the rear side of the previous plate.

Figure 6A:
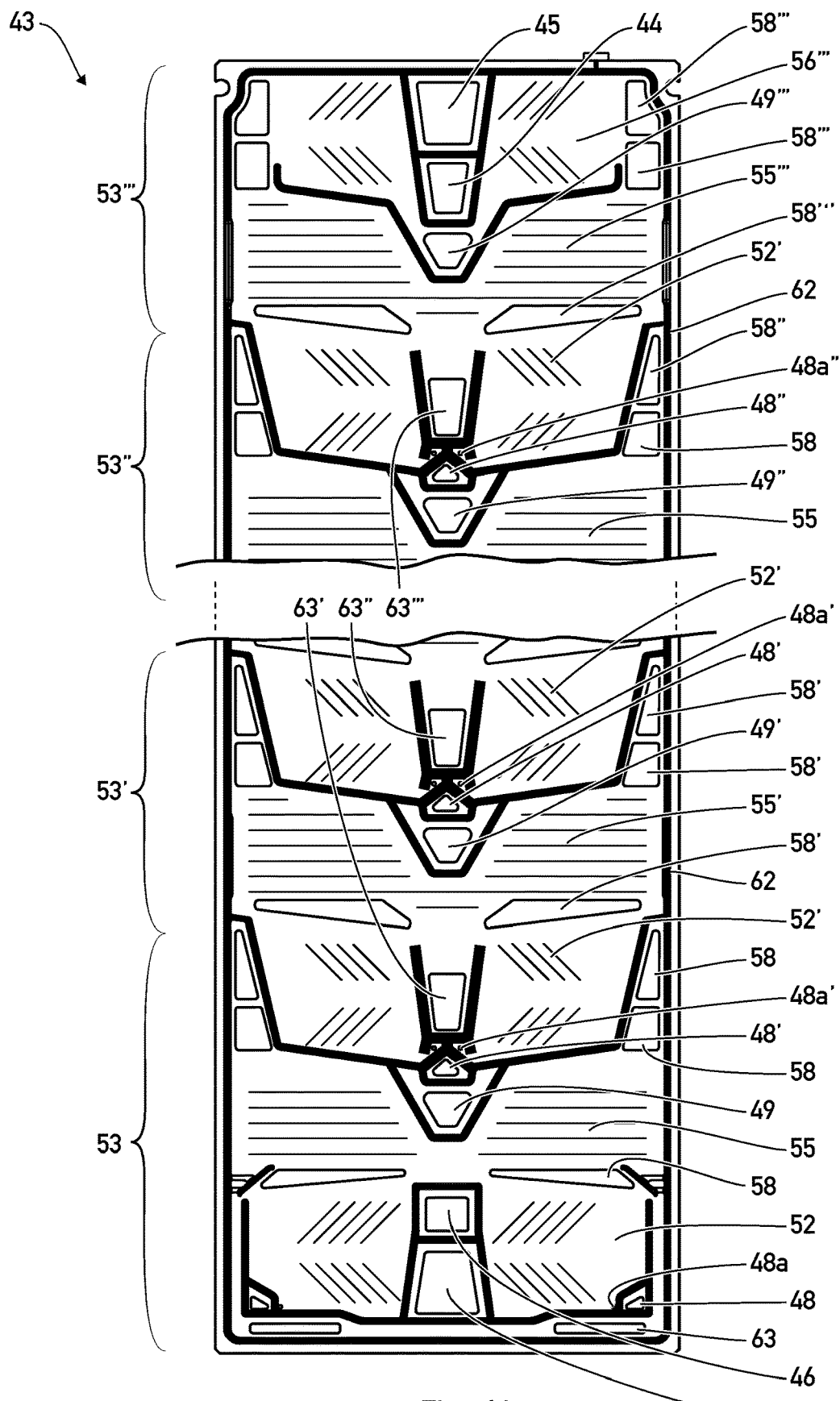
FIG. 6A shows a front view of a plate of a plate package which includes four process volumes.
Figure 6B:
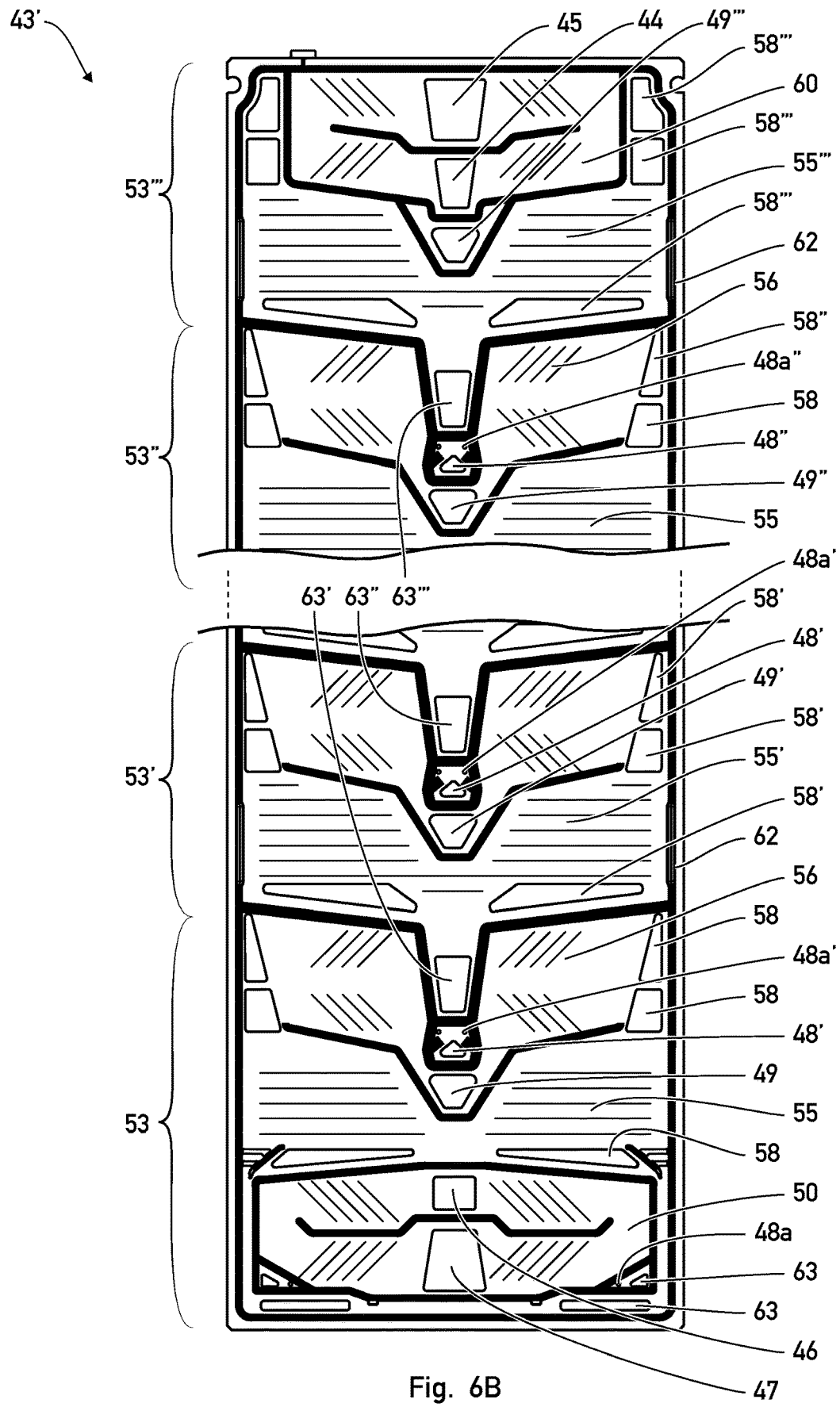
FIG. 6B shows a rear view of the above-mentioned plate of the plate package which includes four process volumes.

FIG. 6A and FIG. 6B shows a front and rear view, respectively, of a plate 43 of a plate package which includes four process volumes 53 53' 53" 53" (or more), as indicated in the figure. The functional principle is the same as the previous plate, except that four process volumes 53 53' 53" 53" (or more) are connected in thermal series instead of two.

Thus, the heating volume is thermally connected via a plate interface to an evaporation section of a first process volume. The condensation section of the first process volume is thermally connected to an opposite evaporation section of a second process volume. The condensation section of the second process volume is thermally connected to an opposite evaporation section of a third process volume. The condensation section of the third process volume is thermally connected to an opposite evaporation section of a fourth process volume. Finally, the condensation section of the fourth process volume is thermally connected to the cooling volume.

The thermal connections are established via thermal interfaces over the plate. The pressure and temperature decreases from the first process volume to the fourth process volume.

Figure 7A:
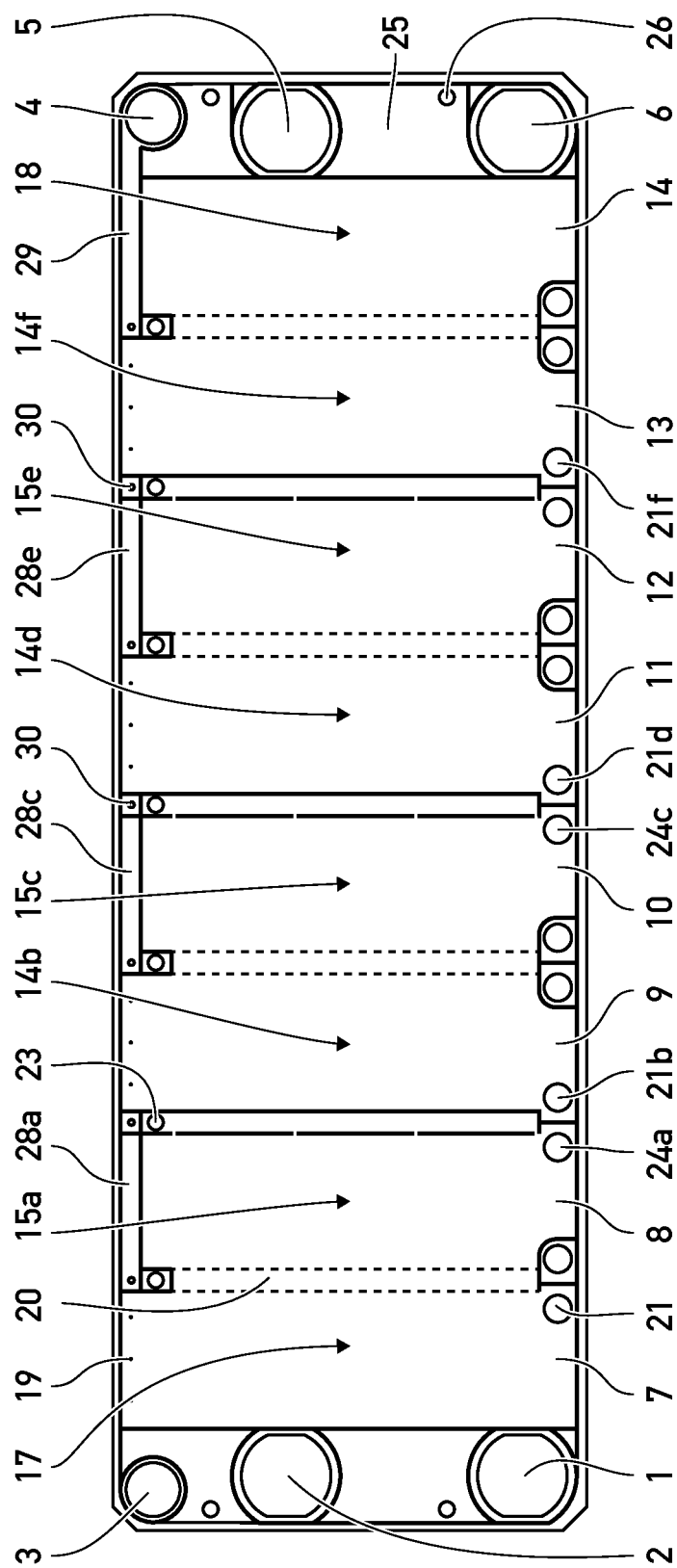
FIG. 7A shows a front view of the A side of a heat exchanging plate of a desalting apparatus in the form of a heat exchanger which is operating according to the falling film principle.
Figure 7B:
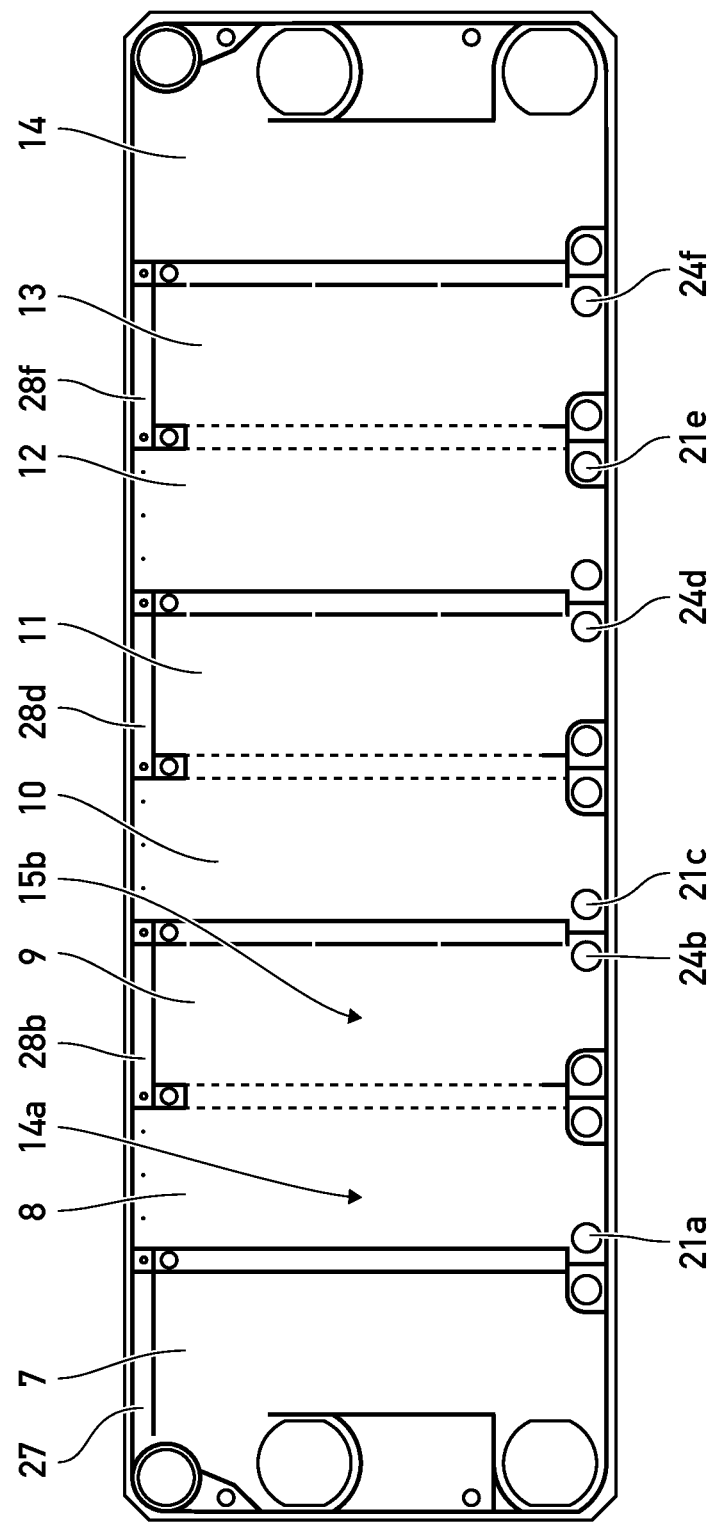
FIG. 7B shows a front view of the opposite B side of the heat exchanging plate of FIG. 7A.

FIG. 7A shows a front view of the A side of a heat exchanging plate of a desalting apparatus of an alternative embodiment which is operating according to the falling film principle whereas FIG. 7B shows a front view of the opposite B side of the heat exchanging plate.

The plates are mounted in an alternating configuration in a plate package, and by simply turning the plate 180 degrees one of the two different plate surfaces A or B may be formed. Different gaskets are used on the opposite sides of the plate such that the desired combination of channels and sections is achieved.

At each of the opposing short ends of the plate three large ports 1-6 are present, and between the ports 1-6 eight thermal interfaces 7-14 in the plates are provided in a horizontal successive configuration. Port 1 is an inlet for a heating medium, preferably water such as jacket water, or alternatively a gas such as steam/vapour may be used. Port 2 is an outlet port for the heating medium. Ports 3 and 4 are inlet ports for the feed, such as sea water, and ports 5 and 6 are inlet and outlet ports, respectively, for the cooling medium, preferably water such as sea water.

At the thermal interface 7, the heating medium is flowing in the heating volume on one side of the heat exchanging plate and in an evaporation section 17 on the opposite side of the heat exchanging plate a vaporisation of the feed entering from the feed inlet through holes 19 occurs. The vaporised feed forms a steam which flows into a condensation section 15a where it is condensed due to the lower temperature in the condensing section 15a. The steam passed through a separation section 20 where droplets and non-evaporated feed are collected and led to a port 21 which removes excess brine. The condensation section 15a is delimited by a gasket. The gaskets are illustrated by a thicker line. Holes 23 may be provided for evacuating non-condensable gases. The condensed steam flows out via a condensate outlet 24a. The evaporation section 17, the separation section 20 and the condensation section 15a form a first processing volume.

When the steam condenses in the condensation section 15a heat is transferred to the feed in an evaporation section 14a which causes the feed to evaporate and flow into a condensation section 15b. The evaporation section 14a and the condensation section 15b together with a separation section therebetween (not numbered) form a further process volume. The same process is repeated in the remaining interfaces until the final condensing section 18. At the condensation section 18 between the ports 4 and 6 there is an evacuation chamber 25 having a port 26 for evacuating non-condensable gases. The feed inlets 3 and 4 are interconnected via the distribution channels 27, 28abcdef, 29 which are interconnected via the holes 30.

The present heat exchanger has five processing volumes each having an evaporation section, a separation section and a condensation section, however, any number from two and above may be feasible. A larger number of processing volumes will yield a better thermal efficiency; however, the cost and complexity of the heat exchanger will increase as well and thus the chosen, e.g. most economical, number of processing will vary from case by case and may very well be a heat exchanger having only two processing volumes in addition to the heating volume and the cooling volume. In such case, one thermal interface is provided for heat exchange between the condensation section of the first processing volume and the evaporation section of the second processing volume.

It is contemplated that while the plate package according to the present invention is primarily used for desalination of sea water in a desalination plant, there exist several other areas of use. These areas of use include but are not limited to clarification of waste water and applications which makes use of the concentrate instead of the condensate, such as manufacturing of fruit juices etc. In such applications, the raw fruit juice is provided as feed and a part of the water content of the raw juice is allowed to evaporate. The remaining concentrate is collected at the non-evaporated feed outlet. Similar processes may be used for non-aqueous feeds such as refinement of ethanol etc.

The invention claimed is:

1. A plate heat exchanger for treatment of a feed such as sea water according to a rising film technique, the plate heat exchanger including a plate package comprising a plurality of heat exchanging plates arranged in a successive order, the plate package defines a heating volume for receiving a heating medium, a cooling volume for receiving a cooling medium and a plurality of process volumes, each of the volumes being fluidly separated from each other in the plate package, each of the process volumes includes:
   an evaporation section being arranged to permit evaporation of at least a part of the feed, the evaporation section having a bottom,
   a separation section being arranged to separate a non-evaporated part of the feed from an evaporated part of the feed,
   a condensation section being arranged to condense the evaporated part of the feed,
   wherein each heat exchanging plate defines a first thermal interface between the heating volume and the evaporation section of a first process volume of the plurality of process volumes, a second thermal interface between the cooling volume and the condensation section of a second process volume of the plurality of process volumes, and at least one further thermal interface between an evaporation section and a condensation section of two adjacent process volumes, and
   wherein each of the process volumes comprises a feed inlet located at the bottom of the evaporation section and a non-evaporated feed outlet located below the separation section when the plate package is disposed in a normal position of use so that the feed entering the evaporation section by way of the feed inlet and evaporated in the evaporation section is evaporated feed that flows upward to the separation section as a part of the rising film technique.

2. The plate heat exchanger according to claim 1, wherein the plate package defines at least two process volumes arranged such that two adjacent process volumes define a thermal interface between respective adjacent condensation and evaporation sections.

3. The plate heat exchanger according to claim 1, wherein the pressure and temperature in the second process volume is lower than in the first process volume.

4. The plate heat exchanger according to claim 1, wherein the volumes are fluidly separated from each other by a gasket.

5. The plate heat exchanger according to claim 1, wherein the feed inlet is located adjacent a centre axis of each heat exchanging plate for at least one process volume of the plurality of process volumes other than the first process volume.

6. The plate heat exchanger according to claim 1, wherein the non-evaporated feed outlet is located adjacent a centre axis of each heat exchanging plate for at least one process volume of the plurality of process volumes other than the first process volume.

7. The plate heat exchanger according to claim 1, wherein the evaporation section comprise a feed inlet located at the top of the evaporation section.

8. The plate heat exchanger according to claim 1, wherein at least one heat exchanging plate define one or more apertures at the separation section of at least one process volume.

9. The plate heat exchanger according to claim 1, wherein the evaporation section and the condensation section are arranged in the same plate interspace for at least one process volume, and/or, wherein the evaporation section and the condensation section are arranged in opposite plate interspaces for at least one process volume.

10. The plate heat exchanger according to claim 1, wherein during use the condensation section of the second process volume is disposed above the evaporation section of the first process volume and within each process volume the evaporation section is disposed below the separation section and the separation section is disposed below the condensation section.

11. The plate heat exchanger according to claim 1, wherein the number of heat exchanging plates is in the range of 4-1000 heat exchanger plates.

12. The plate heat exchanger according to claim 1, wherein the heat exchanger further comprising a pair of end plates covering two opposing sides of the plate package.

13. The plate heat exchanger according to claim 1, wherein the plate package defines 3, 4, 5, 6, 7, 8, 9 or 10 process volumes arranged such that adjacent process volumes define a thermal interface between respective adjacent condensation and evaporation sections.

14. The plate heat exchanger according to claim 1, wherein the number of heat exchanging plates is in the range of 10-100 heat exchanger plates.

15. A plate heat exchanger for treatment of a feed such as sea water, the plate heat exchanger having top and bottom portions at opposite ends of the plate heat exchanger when the plate heat exchanger is disposed in a normal position of use, the plate heat exchanger also having opposite side portions that extend between top and bottom portions of the plate heat exchanger, the plate heat exchanger including a plate package comprising a plurality of heat exchanging plates arranged in a successive order, the plate package defining a heating volume for receiving a heating medium, a cooling volume for receiving a cooling medium and a plurality of process volumes, each of the volumes being fluidly separated from each other in the plate package, each of the heat exchanging plates in the plate package including a top end at the top portion of the plate heat exchanger when the plate heat exchanger is disposed in the normal position of use and a bottom end at the bottom portion of the plate heat exchanger when the plate heat exchanger is disposed in the normal position of use, each of the heat exchanging plates in the plate package also including opposite sides extending between the top and bottom ends of the heat exchanging plates and located at the side portions of the plate heat exchanger when the plate heat exchanger is disposed in the normal position of use, each of the process volumes includes:

an evaporation section being arranged to permit evaporation of at least a part of the feed, a separation section being arranged to separate a non-evaporated part of the feed from an evaporated part of the feed, a condensation section being arranged to condense the evaporated part of the feed; and wherein each heat exchanging plate defines a first thermal interface between the heating volume and the evaporation section of a first process volume of the plurality of process volumes, a second thermal interface between the cooling volume and the condensation section of a second process volume of the plurality of process volumes, and at least one further thermal interface between an evaporation section and a condensation section of two adjacent process volumes.

16. The plate heat exchanger according to claim 15, wherein each of the process volumes comprises a feed inlet located at the bottom of the evaporation section and a non-evaporated feed outlet located below the separation section when the plate package is disposed in a normal position of use.

17. The plate heat exchanger according to claim 15, wherein each heat exchanger plate includes a feed inlet through which feed is introduced into the evaporation section, the plate heat exchanger being configured to operate according to a rising film technique so that feed entering the evaporation section by way of the feed inlet is evaporated, and the evaporated feed flows upward to the separation section as a part of the rising film technique.

18. The plate heat exchanger according to claim 15, wherein the volumes are fluidly separated from each other by a gasket.

19. The plate heat exchanger according to claim 15, wherein the volumes are fluidly separated from each other by plural gaskets in contact with opposite faces of the plates.

* * * * *